United States Patent
Poovendran et al.

(10) Patent No.: US 8,359,480 B2
(45) Date of Patent: Jan. 22, 2013

(54) SCALABLE RFID SYSTEMS: A PRIVACY PRESERVING PROTOCOL WITH CONSTANT-TIME IDENTIFICATION

(75) Inventors: Radha Poovendran, Seattle, WA (US); Basel Alomair, Kirkland, WA (US); Andrew Clark, Bellevue, WA (US); Jorge Cuellar, Baierbrunn (DE)

(73) Assignee: University of Washington, Seattle, WA (US)

( * ) Notice: Subject to any disclaimer, the term of this patent is extended or adjusted under 35 U.S.C. 154(b) by 355 days.

(21) Appl. No.: 12/642,307

(22) Filed: Dec. 18, 2009

(65) Prior Publication Data

US 2010/0161999 A1 Jun. 24, 2010

Related U.S. Application Data

(60) Provisional application No. 61/139,476, filed on Dec. 19, 2008.

(51) Int. Cl.
*G06F 11/30* (2006.01)
*H04L 9/32* (2006.01)
*G06K 7/10* (2006.01)

(52) U.S. Cl. .... 713/189; 713/193; 713/168; 235/472.02

(58) Field of Classification Search .................. 713/189, 713/193, 168; 380/282; 235/472.02
See application file for complete search history.

(56) References Cited

U.S. PATENT DOCUMENTS

| | | | | |
|---|---|---|---|---|
| 6,169,483 | B1 * | 1/2001 | Ghaffari et al. | 340/572.3 |
| 6,933,848 | B1 * | 8/2005 | Stewart et al. | 340/572.3 |
| 2007/0133807 | A1 * | 6/2007 | Lee et al. | 380/282 |
| 2008/0165005 | A1 * | 7/2008 | Burbridge et al. | 340/572.1 |

FOREIGN PATENT DOCUMENTS

GB WO2006075150 * 7/2006

* cited by examiner

*Primary Examiner* — Philip Chea
*Assistant Examiner* — Shu Chun Gao
(74) *Attorney, Agent, or Firm* — Kilpatrick Townsend and Stockton LLP (57) ABSTRACT

A protocol with constant-time complexity solves the problem of private identification of tags in low-cost, large-scale radio frequency identification (RFID) systems—assuming that an adversary has complete control over the communication channel. Each RFID tag has an internal counter, c, and is preloaded with a unique pseudonym, $\psi$, and a secret key, k. A RFID reader attempting to identify and authenticate a tag within its range generates and transmits a random nonce to the RFID tag, which returns a first hash of its current pseudonym and counter, and a second hash that is a function of the secret key. The reader uses the returned data to identify the RFID tag and its secret key by reference to a database and returns other hash values that authenticate the reader to the RFID tag. The most expensive operation that RFID tags are required to perform is a hash function.

10 Claims, 6 Drawing Sheets

SCALABLE RFID SYSTEMS: A PRIVACY PRESERVING PROTOCOL WITH CONSTANT-TIME IDENTIFICATION

RELATED APPLICATIONS

This application is based on a prior copending provisional application, Ser. No. 61/139,476, filed on Dec. 19, 2008, the benefit of the filing date of which is hereby claimed under 35 U.S.C. §119(e).

GOVERNMENT RIGHTS

This invention was made with U.S. government support under Grant No. W911NF-05-1-0491 awarded by the U.S. Army Research Office. The U.S. government has certain rights in the invention.

BACKGROUND

Privacy issues have been limiting the successful commercialization of radio frequency identification (RFID) systems. The ability to trace RFID tags, and ultimately the individuals carrying them, is a major obstacle for the deployment of RFID systems in real life applications. Privacy activists have been concerned about the invasion of users' privacy by RFID tags, calling for the delay or even the abandonment of their deployment. In some cases, companies have been forced to repudiate their plans for RFID deployment in response to the threat of being boycotted over such privacy concerns. As a consequence of these threats, significant effort has been made in the direction of designing RFID systems that preserve the privacy of users.

The three main goals of RFID systems are identification, security, and privacy. Individually, these goals can be achieved relatively easily. However, achieving all the three goals simultaneously is a very challenging task for protocol designers. Identification, by itself, can be as easy as transmitting identifiers of tags in clear text. When combined with the privacy requirement, however, transmitting identifiers in clear text is obviously unacceptable. Adding security to the equation makes things even more complicated. To secure communicated messages against various types of attacks, the cryptographic parameters that are used must be sufficiently long. (The U.S. National Institute for Standards and Technology, NIST, has indicated that 80-bit encryption keys will no longer be secure for symmetric key cryptography by the year 2010.) If the length of the RFID tag identifiers that is used is sufficiently long, so that easily implemented attacks such as random guessing and exhaustive search have only a small probability of success, then searching a database to find those identifiers will be more time consuming and inefficient.

Earlier RFID protocols traded off identification efficiency in order to address all three goals of an RFID system. That is, the three goals were achieved, but the reader was required to perform a linear search among all the RFID tags in the system in order to identify the RFID tag currently being interrogated. In a typical protocol of this class, the reader interrogates the RFID tag by sending a random nonce, $r_1$. The RFID tag generates another nonce, $r_2$, computes $h(ID, r_1, r_2)$, which is the hash of its identifier concatenated with $r_1$ and $r_2$, and then responds with $r_2$ and the resulting hash value. Different protocols implement variants of this approach, but achieving this result is the main functional goal of this class of protocols. Upon receiving the RFID tag's response, the reader performs a linear search of all the RFID tags in the system, computing the hash of their identifiers with the transmitted nonce, until it finds a match. Obviously, unauthorized observers cannot correlate different responses of the same tag, as long as the nonce is never repeated.

Although this class of protocols can provide private identification, they lack the important scalability property. More specifically, this class of protocols may be suitable for small RFID systems, but becomes impractical as the number of tags in the system increases. In an RFID system with millions or billions of tags, performing a linear search for every identification run can be extremely cumbersome and time consuming. Thus, for a RFID system to be practical, it is desirable to employ an identification process that can break the barrier of linear search complexity.

An important step towards solving the scalability issue in RFID systems has been proposed in the prior art. This approach uses a tree structure, where each edge in the tree corresponds to a unique secret key, each leaf of the tree corresponds to a unique tag in the system, and each tag carries the set of keys on the corresponding path from the root of the tree to its leaf. The RFID tag is identified and authorized, by its knowledge of the secret keys along its corresponding path.

However, managing tags in a tree structure based on the secret keys that they possess poses a serious security threat to a RFID system. Every compromised tag will reveal the secret keys from the root of the tree to its leaf. Since these keys are shared by many tags in the system, compromising one tag will reveal secret information about all tags sharing a subset of these keys.

Existing privacy preserving RFID identification schemes, other than tree-based schemes, have a search time complexity of $O(N_T)$, where $N_T$ is the number of tags in the system. A clear advantage of the tree-based scheme is that the search time complexity is reduced to $O(\log N_T)$, which represents a big step towards scalable RFID systems.

Many protocols for low-cost RFID systems have been proposed over the past few years. Some have been shown to be secure, but many have been broken or fail to achieve the claimed properties. For example, one prior approach proposed a privacy preserving identification protocol. In this protocol, when an RFID reader is used to identify a tag within its communication range, it sends a request. The RFID tag generates a random number r, hashes it with its secret ID, and responds with $s=(h(ID,r),r)$, where ID is unique for each tag in the system. Upon receiving the RFID tag's response, the reader performs a linear search, hashing the received r with all the ID's in the database until a match is found. Obviously, an adversary interrogating the same tag multiple times will receive different responses each time, and thus, will be unable to invade the privacy of the RFID tag.

Another prior art protocol differs from the preceding one, because it applies hashing on a non-static identifier instead of a randomized response. Two hash functions, $h_1$ and $h_2$, are used in the implementation of this protocol. Each tag is initialized with a unique ID, and every time that the RFID tag is interrogated, it responds with $h_1$ (ID), which is the hash of its ID. Following every response, the RFID tag replaces its ID by $h_2$ (ID). To identify a tag, the database constructs $N_T$ hash chains (one for each tag), until it finds a match. This protocol also provides private identification.

Another lightweight prior art protocol provides that each tag, $T_i$, has a secret, which is denoted $t_i$, that is known to the database. The reader interrogates the RFID tag by sending a random nonce $r_1$. The RFID tag generates another random number $r_2$, evaluates $M_1=t_i r_2$ and $M_2=ht_i(r_1,r_2)$, where $ht_i$ is a keyed hash function, and sends $M_1$ and $M_2$ to the reader. Upon receiving the RFID tag's response, the reader searches the database for the $t_i$ that satisfies $M_2=ht_i(r_1,M_1,t_i)$. Having identified the RFID tag, the reader responds with a message that allows the RFID tag to authenticate the reader and update its secret $t_i$.

All of these protocols require searching all of the RFID tags in the database until a match is found in order to identify a single tag. Therefore, it can be said that they belong to the linear-time identification class of protocols, which inherently require more time as the number of tags in a database increases.

The second class of protocols is the logarithmic-time identification class, where tag identification requires searching for a time that is proportional to the logarithm of the number of tags in the system.

In the first logarithmic-time identification protocol that appeared in the prior art, to avoid the need to search the entire database for every identification, the RFID tags were arranged in a tree structure based on a secret key possessed by authorized users. The tree is then built such that each edge has a unique secret key. Tags are stored at the leaves of the tree, and each tag stores the keys in the path from the root to its leaf By traversing the tree from top to bottom, the reader can identify tags by the secret key possessed by an authorized user.

Although reducing search-time complexity can be considered a milestone in the design of scalable RFID protocols, it introduces a new security threat. Arranging tags in a tree, based on their secret keys, implies that different tags will share secret information depending on their position in the tree. Therefore, compromising a subset of tags in the system can dangerously undermine the security of other uncompromised tags. In fact, in at least one of the prior art approaches, it has been shown that, by compromising only 20 tags in a system containing $2^{20}$ tags, an adversary can trace an uncompromised tag with a probability close to one.

The advantage of reducing the search-time complexity was attractive but it is not possible to overlook the protocol as a result of the new threat it introduced. In an attempt to mitigate the problem of tag compromise attack, others have proposed a dynamic key update authentication protocol that is similar to the tree-based protocol, but adds the step of updating the tree after every successful protocol run. The idea of key update improves the security of the protocol, but does not provide security against a compromise attack. More precisely, in a system that contains $2^{20}$ tags, an adversary compromising 20 tags will still have a 60% chance of tracing an uncompromised tag.

To address the problem of private identification in RFID systems, it would thus be desirable to employ a protocol that not only breaks the linear search complexity barrier, but also improves on the efficiency of the logarithmic search complexity and enables tag identification with constant-time search complexity. Unlike tree-based protocols, such a protocol should also be resilient to tag compromise attacks, so that compromising a subset of tags in the system, regardless of the size of the subset, should not affect the security of the remaining uncompromised tags.

SUMMARY

To address the concerns noted above, an exemplary method is employed for securely identifying and authenticating radio frequency identification (RFID) tags while maintaining privacy. The method includes the step of providing each RFID tag with an internal counter, a unique pseudonym, and a secret key. In addition, a database is created and initialized to include data identifying the RFID tags. A random nonce is generated and conveyed to a RFID tag that is to be identified.

At the RFID tag to be identified, a first hash value is computed of the unique pseudonym and a current value of the counter for the RFID tag, and a second hash value is computed that is a function of the secret key, the random nonce, the unique pseudonym, and the current value of the counter for the RFID tag. The first hash value and the second hash value are conveyed to a reader, which accesses the database to attempt to identify the RFID tag as a function of the first hash value. The database includes the unique pseudonym, the secret key, and a new unique pseudonym for the RFID tag, all of which are associated with the first hash value. If the reader is successful in identifying the RFID tag, it next authenticates that the RFID tag for which the first and the second hash values were computed is the RFID tag that was identified in the database. This authentication step is carried out using the second hash value to confirm that the RFID tag being identified had the secret key that was stored in the database for the RFID tag that was just identified.

If the RFID tag that was identified is authenticated, the method then provides for computing a plurality of hash values as functions of the pseudonym, the secret key, the second hash conveyed to the reader, and the new unique pseudonym. The plurality of hash values are then conveyed to the RFID tag that was identified and authenticated. The RFID tag then tries to authenticate the reader using one of the plurality of hash values, and if the reader was authenticated, uses another of the plurality of hash values to determine the new unique pseudonym. Next, using still another of the plurality of hash values, the RFID tag attempts to verify an integrity of the new pseudonym that was determined.

The method also includes the steps of selecting parameters that must be determined before initializing values included in the database and in each of the RFID tags. Using the parameters that were selected, the database is initialized so that it includes a first hash value, a secret key, and a new unique pseudonym for each RFID tag that can be identified. The unique pseudonym and secret key can then be loaded into each of the RFID tags.

The method can also include the step of choosing a function for use in computing the first hash value and the second hash value such that the first and the second hash values used in connection with the database are distinct, to minimize a probability of collisions between hash values associated with different RFID tags.

The step of selecting parameters can include the step of selecting at least one parameter from the group consisting of a total number of unique pseudonyms that can be used for the RFID tags, where a total number of the RFID tags is less than the total number of unique pseudonyms; a maximum counter value that can be employed by the RFID tags; a length in bits for the secret keys and for the unique pseudonyms; a hash function used to compute the first hash value and the second hash value when identifying a RFID tag, as well as an output length of the hash function; and a length of truncated hash values used to access data in the database.

The method can also include the step of organizing the database to include pointers to other parts of the database, as well as a first hash value for each different RFID tag that can be identified, and information about each RFID tag, in association with a unique pseudonym for the RFID tag. The database can be organized with three parts, including a first part including pointers that comprise truncated first hash values and which point to mini tables in a second part of the database. The second part can including mini tables of untruncated first hash values for the RFID tags and second pointers to the information about RFID tags. The information is then included in a third part of the database.

The database is modified each time that a new unique pseudonym is provided to one of the RFID tags, so that the new unique pseudonym, the first hash value, and the second hash value are updated and associated with the information about the RFID tag that was just provided the new unique pseudonym.

Another part of the method includes the step of randomly selecting the unique pseudonyms provided to the RFID tags from a set of all possible bit strings of a predefined number of bits, so that a different unique pseudonym is provided to each RFID tag. This unique pseudonym is employed in the database in connection with the identification of the RFID tag with which it is associated.

Another aspect of this approach is directed to a machine readable memory medium on which are stored machine executable instructions. When executed by a processor, the instructions carry out a plurality of functions for securely identifying and authenticating radio frequency identification (RFID) tags while maintaining privacy. These functions are generally consistent with the steps of the exemplary method discussed above.

This application specifically incorporates by reference the disclosure and drawings of the patent application identified above as a related application.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

System Model

RFID systems are typically broken down into three main components: a tag, a reader, and a database. In an exemplary embodiment of the present model, the RFID tag is assumed to have limited computing power: hash computations are the most expensive operations that tags can perform. The reader is a computationally powerful device with the ability to perform sophisticated cryptographic operations. The database is a storage resource at which information about the RFID tags in the system is stored. Communications between readers and the database are assumed to be secure (either by using secure wired connections or by establishing secure channels using proven secure cryptographic primitives).

In a typical RFID system, the number of tags is orders of magnitudes larger than the number of readers. When an RFID tag is within the communication range of a reader, the reader interrogates the RFID tag in order to carry out the identification process. Upon interrogation, the RFID tag responds with a quantity that uniquely identifies the RFID tag and allows the reader to access the database and obtain information about the RFID tag.

Adversarial Model

An adversary is assumed to have complete access to the communication channel used by tags and readers. Thus, the adversary can observe all messages exchanged between valid readers and tags, modify exchanged messages, block exchanged messages and replay them later, as well as generate messages. However, the following discussion does not consider an adversary whose only goal is to jam the communication channel.

The adversary is modeled as a polynomial-time algorithm. In an approach that is similar to the adversarial model proposed by others, it is assumed that given a tag, T, and a reader, R, the adversary has access to the following oracles:

Query(T,$m_1$,$m_3$): The adversary acts as the reader in an instance of the protocol. The adversary sends $m_1$ as the first message to T, receives a response, and then sends the message $m_3$. This oracle models the adversary's ability to interrogate the RFID tag.

Send(R,$m_2$): The adversary executes the protocol, acting as the RFID tag. The adversary sends $m_2$ to the reader R and receives the reader's response. This oracle models the adversary's ability to act as a tag in the system.

Execute(TR): The RFID tag, T, and the reader, R, execute an instance of the protocol. The adversary eavesdrops on the channel and can also tamper with the messages exchanged between T and R. This oracle models the adversary's ability to actively monitor the channel between tag and reader.

Reveal(T): This query models the exposure of the RFID tags' secret parameters to the adversary. The oracle simulates the adversary's ability to physically capture the RFID tag and obtain its secret information.

The adversary can call the oracles Query, Send, and Execute any polynomial number of times. The Reveal oracle can be called only once, at which the RFID tag is considered compromised and, thus, there is no point in calling the other oracles after the Reveal oracle has been called.

Security Model

The main security goals of the present exemplary protocol are privacy and authenticity. Privacy is measured by the adversary's ability to trace tags by means of the adversary's responses in different protocol runs. The three notions of untraceability, i.e., universal untraceability, forward untraceability, and existential untraceability, are defined as follows.

Definition 1 (Universal Untraceability): Tags in an RFID system are said to be universally untraceable if an adversary cannot track a tag based on information gained before the RFID tag's last authentication with a valid reader. In other words, there is no correlation between a tag's responses before and after being scanned by a valid reader.

Universal untraceability is modeled by the following game between the challenger C (i.e., an RFID system) and a polynomial time adversary A.

1. A signals C to begin the game.
2. C selects two tags, $T_0$ and $T_1$, a valid reader, R, and gives them to A.
3. A makes queries of $T_0$, $T_1$, and R using the Query, Send, and Execute oracles for a number of times of its choice.
4. A stops calling the oracles and notifies C.
5. C carries out an instance of the protocol with $T_0$ and $T_1$, during which mutual authentication of both tags with R is achieved.
6. C selects a random bit, b, and sets $T=T_b$.
7. The adversary makes queries of T and R using the Query, Send, and Execute oracles.
8. A outputs a bit, b'. The adversary wins the game if b'=b.

The second notion of privacy, forward untraceability, is defined as follows.

Definition 2 (Forward Untraceability): In an RFID system with forward untraceability, an adversary capturing the RFID tag's secret information cannot correlate the RFID tag with its responses before the last mutual authentication with a valid reader.

Assume there is an adversary observing an exchanged message between a tag and a valid reader. If at a certain point in time, the secret keys of the RFID tag are exposed to the adversary (for example, by physically capturing the RFID tag), the adversary cannot correlate the RFID tag with its previously observed past instances.

Forward untraceability is modeled by the following game between the challenger C (i.e., an RFID system) and a polynomial time adversary A.

1. A signals C to begin the game.
2. C selects two tags, $T_0$ and $T_1$, a valid reader, R, and gives them to A.
3. A makes queries of $T_0$, $T_1$, and R using the Query, Send, and Execute oracles for a number of times of its choice.
4. A stops calling the oracles and notifies C.
5. C carries out an instance of the protocol with $T_0$ and $T_1$, during which mutual authentication of both tags with R is achieved.
6. C selects a random bit, b, and sets T=Tb.
7. The adversary calls the oracle Reveal (T).
8. A outputs a bit, b'. The adversary wins the game if b'=b.

The third notion of privacy, existential untraceability, is defined as follows.

Definition 3 (Existential Untraceability): Tags in a RFID system are said to be existentially untraceable if an active adversary cannot track a tag based on its responses to multiple interrogations, even if the RFID tag has not been able to accomplish mutual authentication with an authorized reader.

Existential untraceability is modeled by the following game between the challenger C (an RFID system) and a polynomial time adversary A.

1. A signals C to begin the game.
2. C selects two tags, $T_0$ and $T_1$, and gives them to A.
3. A makes queries of $T_0$ and $T_1$ using the Query oracle for at most C1 number of times for each tag, where C1 is a pre-specified system security parameter.
4. A stops calling the oracles and notifies C.
5. C selects a random bit, b, and sets T=Tb.
6. The adversary makes a query of T using the Query oracle.
7. A outputs a bit, b'. The adversary wins the game if b'=b.

To quantify the adversary's ability to trace RFID tags, the adversary's advantage of successfully identifying the RFID tag in the previous games is defined as:

$$Adv_A = 2(Pr(b'=b) - \tfrac{1}{2}). \qquad (1)$$

If the adversary cannot do any better than a random guess, then $Pr(b'=b)=\tfrac{1}{2}$. Consequently, the adversary's advantage, $Adv_A$, is zero, at which point it is said that tags are untraceable.

The other security goal of the present exemplary novel protocol is mutual authentication. Inspired by the work of others in the prior art, an honest protocol run is defined as follows.

Definition 4 (Honest Protocol Run): A mutual authentication protocol run in the symmetric key setup is said to be honest if the parties involved in the protocol run use their shared key to exchange messages, and the messages exchanged in the protocol run have been relayed faithfully (without modification).

Another term that will be used herein is the definition of negligible functions. As is known in the art, negligible functions are defined as follows.

Definition 5 (Negligible Functions): A function $\gamma: N \rightarrow R$ is said to be negligible if for any nonzero polynomial $\wp$, there exists $N_0$ such that for all $N > N_0$, $|\gamma(N)| < (1/\wp(N)|)$. That is, the function is said to be negligible if it converges to zero faster than the reciprocal of any polynomial function.

A formal definition of secure mutual authentication for RFID systems follows.

Definition 6 (Secure Mutual Authentication): A mutual authentication protocol for RFID systems is said to be secure if and only if it satisfies all of the following conditions:

1. The secret parameters of the RFID tag cannot be recovered by observing messages exchanged in protocol runs.
2. Authentication $\Rightarrow$ Honest protocol: the probability of achieving mutual authentication when the protocol run is not honest is negligible.
3. Honest $\Rightarrow$ protocol Authentication: if the protocol run is honest, the RFID tag-reader pair must authenticate each other with a probability equal to one.

To model the adversary's attempt to authenticate as a tag to a reader (i.e., to impersonate a tag in the system), the following game between the challenger C and adversary A is proposed.

1. A signals C to begin the game.
2. C chooses a tag, T, at random, a reader, R, and gives them to A.
3. A calls the oracles Query, Send, and Execute using T and R for a number of times of its choice.
4. A decides to stop and signals C to move on to the next phase.
5. C initiates communication with A (as if A is a tag in the system).
6. A responds with a string, s. If s is accepted as a valid tag response, A wins the game.

Similarly, to model the adversary's attempt to authenticate as if a reader of an RFID tag, the following game between the challenger C and adversary A is proposed.

1. A signals for the game to begin.
2. C chooses a tag, T, at random, a reader, R, and gives them to A.
3. A calls the oracles Query, Send, and Execute using T and R for a number of times of its choice.

4. A decides to stop and signals C to move on to the next phase.

5. A initiates communication with T (as if A is a valid reader), and observes its response.

6. A responds with a string, s. If s is accepted as a valid reader response by T, A wins the game.

Definition 6 implies that this exemplary novel protocol achieves secure mutual authentication only if the adversary's probability of winning either one of the previous two games is negligible.

Protocol Overview

In the present exemplary system, each tag has an internal counter, c, and is preloaded with a unique pseudonym, $\psi$, and a secret key, k. The secret key and the pseudonym are updated whenever mutual authentication with a valid reader is accomplished, while the counter is incremented every time authentication fails.

To allow for constant-time identification, the structure of the database is divided into three logical parts. The first part consists of pointers that allow direct accessing to entries in the second part. The second part, in turn, contains pointers that allow direct accessing of information about an interrogated tag. As described below, this architecture allows for constant-time identification.

When an RFID reader is to identify and authenticate a tag within its range, it generates a random nonce, $r \in_R \{0,1\}^L$, and transmits it to the RFID tag. Upon receiving r, the RFID tag computes $h(\psi,c)$ and $\tilde{r}:=h(0,\psi,c,k,r)$, where $\psi$ is the RFID tag's current pseudonym, k is the RFID tag's current secret key, c is the RFID tag's internal counter, and r is the received nonce. The RFID tag then increments its counter after replying to the reader. If authentication succeeds and the tag updates its pseudonym, the counter is reset to zero, implying that the counter is only incremented if authentication fails. With $h(\psi,c)$, the reader accesses the database to identify the RFID tag and obtain its information, including its pseudonym, $\psi$, its secret key, k, and a new pseudonym, $\psi'$, to update the RFID tag. With $\tilde{r}$, the reader authenticates the RFID tag by confirming its knowledge of the secret key, k, obtained from the database.

TABLE 1

A list of parameters and used notations

| | |
|---|---|
| $N_T$ | The total number of tags in the system |
| N | The total number of pseudonyms chosen by the system designer |
| $\psi_i$ | The $i^{th}$ pseudonym |
| C | The maximum counter value chosen by the system designer |
| l | The length of the secret parameter in bits |
| h: $\{0,1\}^* \rightarrow \{0,1\}^L$ | The cryptographic hash function used, mapping strings with arbitrary lengths to L-bit strings |
| L | The output length of the hash function used |
| n | The length of the truncated hash values |
| $\Psi_{i,c}$ | Tags' identifiers $\Psi_{i,c} := h(\psi_i,c)$ |
| $\Psi_{i,c}{}^n$ | The n most significant bits of $\Psi_{i,c}$ |
| $\lceil x \rceil$ | For a real number x, $\lceil x \rceil$ is the smallest integer greater than or equal to x |
| $x \in_R S$ | x is a random element of the set S |

Once the RFID tag has been identified and authenticated, the reader responds with $h(1,\psi,k,\tilde{r})$, $h(2,\psi,k),\psi'$, and $h(3,\psi', k,\tilde{r})$. With $h(1,\psi,k,\tilde{r})$, the RFID tag authenticates the reader (by verifying its knowledge of its secret key, k). If the reader is authenticated, the RFID tag uses $h(2,\psi,k),\psi'$ to extract its new pseudonym, $\psi'$. Once the new pseudonym has been computed, the RFID tag verifies its integrity using $h(3,\psi,k,\tilde{r})$. The RFID tag and the reader then update the RFID tag's secret key to k'=h(k), truncated to the required length, l.

Figure 1:
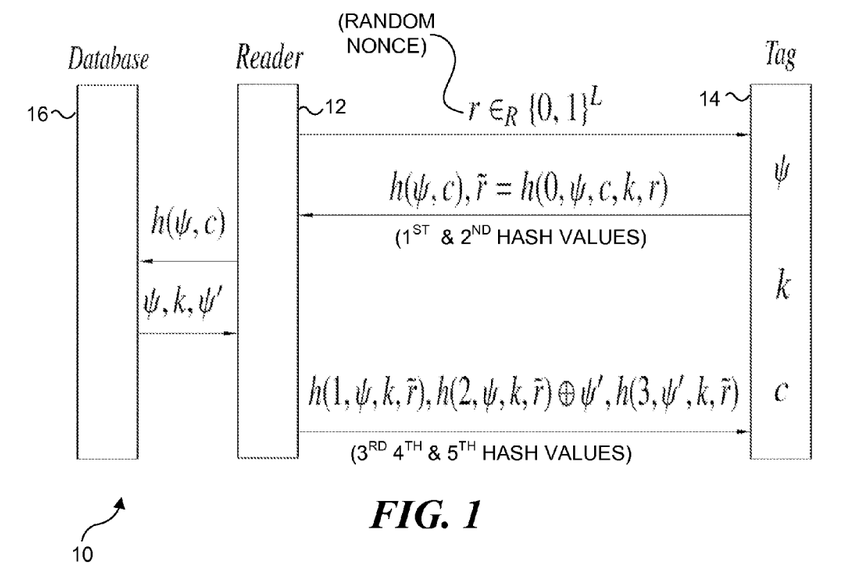
FIG. 1 is a schematic block diagram illustrating an exemplary embodiment of the present novel privacy preserving protocol.

FIG. 1 includes a block diagram 10 that depicts an exemplary single protocol run between an RFID reader 12 and an RFID tag 14. The RFID reader uses data in a database 16 to identify RFID tag 14, as explained below. The protocol can be broken into three main phases: system initialization phase, tag identification phase, and identity randomization and system update phase. Each phase is detailed below.

System Initialization

During this phase, the database is initialized and each tag is preloaded with secret information. The secret information includes the RFID tag's secret key, which the RFID tag and reader use to authenticate one another, and the RFID tag's pseudonym, which is used by the reader to identify the RFID tag.

Given the total number of tags the RFID system is suppose to handle, $N_T$, and predefined security and performance requirements (as discussed below), the system designer chooses the following parameters to start the initialization phase:

The total number of pseudonyms, N. Since pseudonyms will be used as unique tag identifiers, there must be at least one pseudonym for every tag in the system. Furthermore, since tags are assigned new identifiers following every successful mutual authentication process with an authorized reader, the total number of pseudonyms must be greater than the total number of tags in the system, i.e., $N > N_T$. (N can be chosen to be a constant multiple of $N_T$, e.g., $N = FN_T$, where F is a positive integer chosen by the system designer.)

The maximum counter value, C. The counter is used by RFID tags to mitigate traceability by active adversaries; the larger the counter is, the more difficult it will be for active adversaries to track the RFID tag. On the downside, the size of the database will grow linearly with the maximum value of the counter (the database size is O(NC)). Therefore, the size of the counter is a trade-off between the privacy of tags and the system complexity, and these parameters must be decided by the system designer (according to the security and performance requirements).

The length, l, in bits, of the secret parameters for the RFID tags (pseudonyms and keys). As in any symmetric key cryptosystem, this parameter should be chosen properly to prevent easy-to-implement attacks, such as exhaustive search and random guessing.

The hash function, h. More particularly, the output length of the hash values, L, is of special importance. The length must be chosen to be sufficiently large so that there are no collisions during database initialization, which is described below.

The length, n, of the truncated hashes. The value of n should be at least $n = \log_2 NC$.

Once the system parameters have been chosen, the initialization phase can start. The initialization phase can be summarized in the following steps.

1. Given the number of pseudonyms, N, and the length of each pseudonym, l, the system designer draws, without replacement, N pseudonyms randomly from the set of all possible l-bit strings. That is, N distinct pseudonyms, $\psi_1,\psi_2,\ldots,\psi_N$, are chosen at random from $\{0,1\}^l$. Each tag is given a unique pseudonym and a secret key, and the counter for each tag is initially set to zero.

Figure 2:
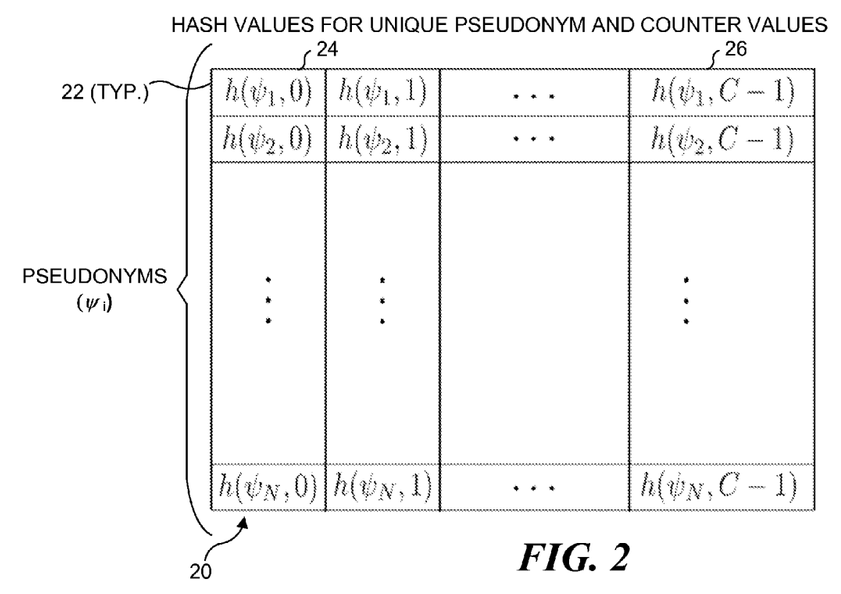
FIG. 2 is an exemplary table of hash value used in a database accessed by a reader of the RFID tags, where the table illustrates hash values computed during initialization of the database for each of N pseudonyms and each RFID tag counter value, from 0 through C−1, where C is a predefined parameter.

2. For each pseudonym, $\psi_i$, the hash value $h(\psi_i,c)$ is computed for all i=1, 2, . . . , N and all c=0, 1, . . . , C−1 i.e., a total of NxC hash operations must be performed. FIG. 2 depicts a table 20 that illustrates examples of hash values 22 that are thus generated for N unique pseudonyms and the RFID tag counter values from 0 (hash values shown in a column 24) through C−1 (hash values shown in a column 26).

Each row of the table in FIG. 2 corresponds to the same unique pseudonym. Therefore, all entries in the $i^{th}$ row must point to the same memory address carrying information about the RFID tag identified by the unique pseudonym $\psi_i$.

In order for tags to be identified uniquely, the hash values in the table of FIG. 2 must be distinct. This goal can be achieved by choosing the hash function, h, to be an expansion function, as opposed to the usual hash functions that are used, which are compression functions, so that any collisions will occur with a small probability, e.g., $2.9 \times 10^{-39}$ for L equal to 128 bits and assuming (reasonably) that the outputs of the hash function are uniformly distributed over all possible outputs. For example, an expanding hash function can be achieved by concatenating multiple hash functions, i.e., $h(x) = h_1(x) \| \ldots \| h_m(x)$, so that $h(x)$ has the required length. It will be assumed that the output of the hash function has length L bits, which must be at least equal to $\log_2 NC$ so that the table in FIG. 2, which is of size NC, can be constructed without collisions (L will be much larger in practice). If a pseudonym that causes a collision in FIG. 2 is found, the pseudonym is replaced by another one that does not cause a collision. (It should be noted that the pool of possible pseudonyms is of size $2^l$, which is much larger than the required number of pseudonyms N, which gives the system designer sufficient freedom to properly construct the system.) With the appropriate choice of the hash function, a table of hash values with no collisions can be constructed. Since this operation is only performed once, i.e., at the initialization phase, time complexity is not an issue thereafter.

Since the length of $h(\psi_i,c)$ (the identifiers of the RFID tags), L, is large to avoid collisions, it would be infeasible to have a physical memory that can accommodate all possible L-bit strings (for direct addressing). For example, if L=128, a database size on the order of $4 \times 10^{28}$ Gigabytes would be required. Previously proposed privacy-preserving schemes solve this problem in one of two ways. The first approach requires $O(N_T)$ memory space to store information about each tag in the system and requires the reader to perform a linear search among tags in the system to identify responses of the RFID tags, thus requiring $O(N_T)$ space and $O(N_T)$ time for identification. The other method identifies tags based on their key information and requires the reader to perform a logarithmic search to identify responses of the RFID tags, thus requiring $O(N_T)$ space and $O(\log N_T)$ time for identification, as is known in the art.

Figure 3:
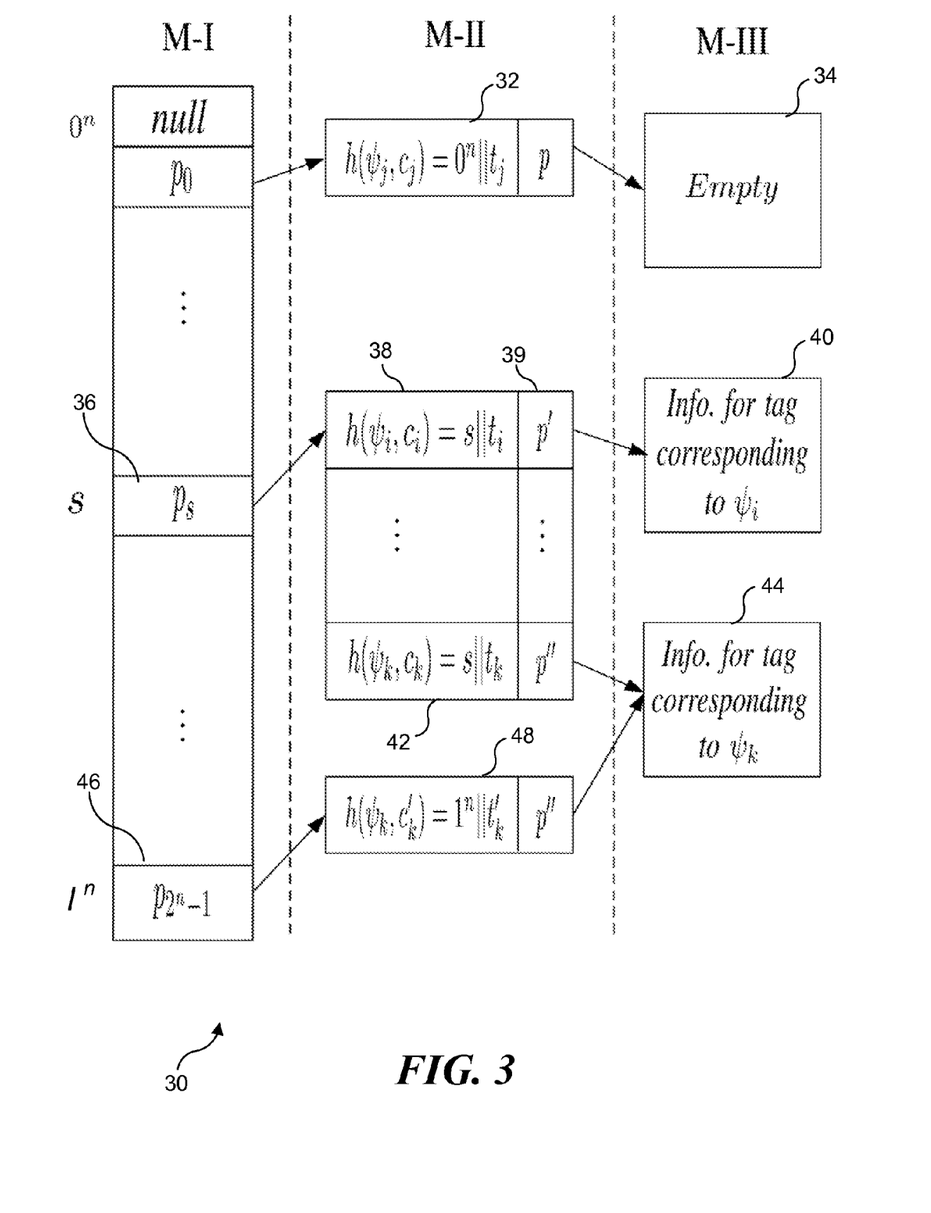
FIG. 3 illustrates an exemplary architecture for the database, where each entry in a table in a column M-I points to another, smaller table in a column M-II that includes data from the table of FIG. 2, and each of the entries in the smaller tables in M-II point to information for the RFID tags.

For ease of presentation, the database can be divided into three logical parts, M-I, M-II, and M-III, as shown for a representation of an exemplary database 30 in FIG. 3. The first part, M-I, consists of a single table of size $O(2^n)$, where $n \geq \log_2 NC$ (n is chosen so that $2^n \geq NC$). The second part, M-II, consists of multiple smaller tables, such as exemplary tables 32, 38, and 48; the total size of all the tables in M-II is $O(NC)$. Finally, the last part, M-III, is of size $O(N)$.

The table in M-I is a table of pointers, such as pointers 36 and 46. The addresses of M-I range from $0^n$ to $1^n$. Each entry in the table points to the head of one of the mini tables in M-II (according to a specific relation that is explained below).

Each entry of M-II contains two fields. In the first field, the hash values obtained in the table of FIG. 2 are stored (i.e., $h(\psi_i,c)$ for all $i=1, \ldots, N$ and all $c=0, \ldots, C-1$). M-II is organized based on the hash values stored in the first field. It is noted that two hash values $h(\psi_1,c_1)$ and $h(\psi_2, c_2)$ are in the same position, b, if their n most significant bits are the same (recall that the output length of the hash function is L>n). All hash values that have the same position, i.e., share the n most significant bits, are stored in the same mini table in M-II (e.g., the hash values with b=s, where pointer 36 points to table 38 of FIG. 3). Hash values with distinct positions are stored in different tables (e.g., hash values with $b=0^n, s, 1^n$ in FIG. 3 are respectively stored in tables 32, 38, and 48). (Recall that FIG. 2 contains the computed hash values; thus, table M-II can be viewed as a reorganized version of the two-dimensional table 20 in FIG. 2, i.e., reorganized as a one-dimensional table of size $O(NC)$.) The second field of each entry of M-II stores a pointer such as a pointer 39 to an entry in M-III containing information about a tag in the system (depending on the value of the first field), such as information field 40. For example, if the value stored in the first field is $h(\psi_i,c)$, which is in the first row of table 38, then the value in the second field will be pointer 39 to the data entry in M-III where information 40 about the RFID tag with unique pseudonym $\psi_i$ can be found. It should be noted that table 32 includes a pointer p that points to an empty field 34 in M-III. Field 34 is empty because there is currently no tag in the system with pseudonym $\psi_j$, as is evident in the example of FIG. 3. Since the number of pseudonyms in the system, N, is larger than the number of tags, $N_T$, which is necessary to ensure that there will be pseudonyms available to update the tag upon its identification, there will be $N-N_T$ empty spaces in M-III. Assuming that the reader has identified a tag in the system, the reader will select one of the unused pseudonyms to update the tag. If $\psi_j$ is the selected pseudonym, then the information about the tag will be copied into empty field 34, since $\psi_1$ is now the current pseudonym for the tag.

After M-II has been constructed, the pointers at M-I are chosen to satisfy the following: the pointer stored at address a in M-I must point to the mini table in M-II that stores identifiers with position a. In other words, each pointer in M-I must point to the identifiers with position equal to the address of the pointer.

Finally, M-III is the actual memory where information for the RFID tags is stored. FIG. 3 depicts the architecture of the database with the three logical partitions. The identification phase below will further illustrate the structure of the database.

Tag Identification

Tags in a protocol run of the system are identified by the hash of their pseudonyms concatenated with their internal counters. Denote by $\Psi_{i,c}$ the hash value of the $i^{th}$ pseudonym concatenated with a counter c; that is, $\Psi_{i,c} := h(\psi_i,c)$. Furthermore, using $\Psi_{i,c^n}$, denote the truncated value of $\Psi_{i,c}$; more precisely, $\Psi_{i,c}{}^n$ represents the n most significant bits of $\Psi_{i,c}$ (i.e., the position of $\Psi_{i,c}$).

Once $\Psi_{i,c}$ has been received, the reader accesses the data entry at address $\Psi_{i,c}{}^n$ in M-I. This table entry is actually a pointer, p, to one of the tables in M-II. There are three possible scenarios here:

1. The value at address $\Psi_{i,c}{}^n$ in M-I is a null, which implies that, during the construction of the table in FIG. 2, no identifier with position $\Psi_{i,c}{}^n$ was constructed. Therefore, either the RFID tag is not a valid one, or the RFID tag's response has been modified. In the example of FIG. 3, if the n most significant bits of the received $\Psi_{i,c}$ are zeros, then no valid tag matches this response.

2. The pointer, p, at address $\Psi_{i,c}{}^n$ points to a table in M-II with exactly one entry. In this scenario, the first field of the entry pointed at by p must be the entire (untruncated) $\Psi_{i,c}$; the value at the second field will be a pointer to the entry in M-III that contains information about the interrogated tag. In the example of FIG. 3, if the n most significant bits of the received $\Psi_{i,c}$ are ones, then pointer 46 at address $1^n$ in M-I will point to the entry (i.e., table 48) at M-II at which $\Psi^{k,c'}_{k}=l''\|t'_k$ and the pointer, p'', are stored. In turn, p'' will point to the entry at M-III where information 44 about the RFID tag with unique pseudonym $\psi_k$ is stored.

3. The pointer at address $\Psi_{i,c}''$ of M-I points to a table in M-II with more than one entry. In this scenario, the reader searches the first fields of the mini table in M-II until it reaches the entry that matches the complete (untruncated) received identifier, $\Psi_{i,c}$. Next, it follows the pointer (in the corresponding second field) to obtain the RFID tag's information. In the example of FIG. 3, if the received identifier is $\Psi_{k,c_k}=s\|t_k$, the reader will follow pointer 36 at address s of M-I. The pointer, however, points to table 38 in M-II with more than one entry. Therefore, the reader must search until it reaches the last entry of table 38 to find a match for the received $\Psi_{k,c_k}=s\|t_k$. Once the match is found, the reader can follow the pointer, p'', to the entry in M-III containing information 44 about the RFID tag with the current unique pseudonym $\psi_k$.

The identification process allows for unique identification of tags in the system. This result is due to the requirement that, in the initialization phase, the values in the table of FIG. 2 are distinct. Consequently, the entries in M-II are distinct, enabling the unique identification of tags.

Identity Randomization and System Update

Once a tag has been authenticated, the reader draws one of the unoccupied pseudonyms generated in the initialization phase. (Recall that the number of pseudonyms is greater than the number of tags in the system; consequently, there will always be unused pseudonyms available for identity randomization.) Once an unoccupied pseudonym has been chosen, it is to be transmitted to the RFID tag in a secret and authenticated way.

To allow for correct identification of a tag after its pseudonym has been updated, the database must be updated accordingly. A straightforward way of updating the database is by updating the pointers corresponding to the outdated and updated pseudonyms. For example, if the RFID tag's outdated pseudonym is $\psi_i$ and its updated pseudonym is $\psi_k$, then all pointers in M-II corresponding to entries $\Psi_{i,0}, \Psi_{i,1}, \ldots, \Psi_{i,C-1}$ must point to a null; and all pointers in M-II corresponding to entries $\Psi_{k,0}, \Psi_{k,1}, \ldots, \Psi_{k,C-1}$ must point to the entry in M-III containing information about the RFID tag. This method, however, requires O(C) updates.

Figure 4:
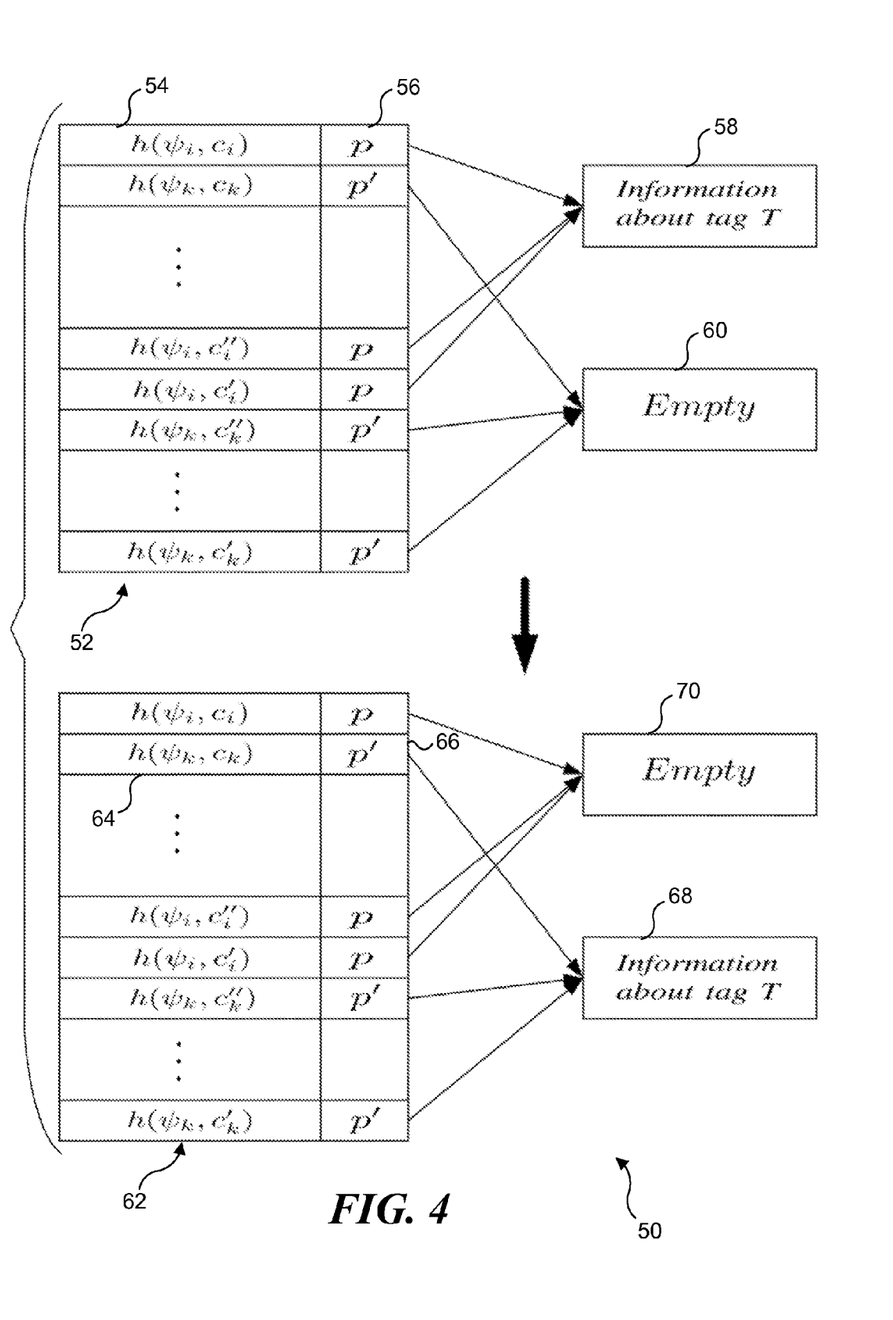
FIG. 4 illustrates an exemplary database update, wherein only the RFID tag information is updated, so that it is only necessary to update two entries instead of O(C) entries.

An alternative method that allows a faster update is graphically depicted in a schematic diagram 50 shown in FIG. 4. In this diagram, an upper portion 52 shows hash values 54 and pointers 56 before the pseudonym for a tag is updated. Pointers p then point to information 58, while pointers p' point to an empty field in M-III. After the RFID tag is provided a new unique pseudonym, instead of updating the pointers as in the previous method, the information for the RFID tag is moved to the entry in M-III pointed at by the pointers corresponding to the updated pseudonym in M-II. Lower portion 62 shows the hash values and pointers after this approach is used to update the database for the change to the new unique pseudonym. New hash values 64 are now associated with pointers p', which point to information about the RFID tag in field 68, leaving field 70 now empty.

The only downside to this method over the previous one is that the size of M-III will increase from $O(N_T)$ to $O(N)$. (Asymptotically, however, N and $N_T$ are of the same size.) In the example of FIG. 4, instead of changing all entries in M-II with pointer p' to p, and changing entries with pointer p to null, the RFID tag's information is moved to the entry in M-III pointed at by p' and the entry pointed at by p is emptied.

Flowchart Showing Exemplary Steps for Identifying RFID Tags

Figure 5A:
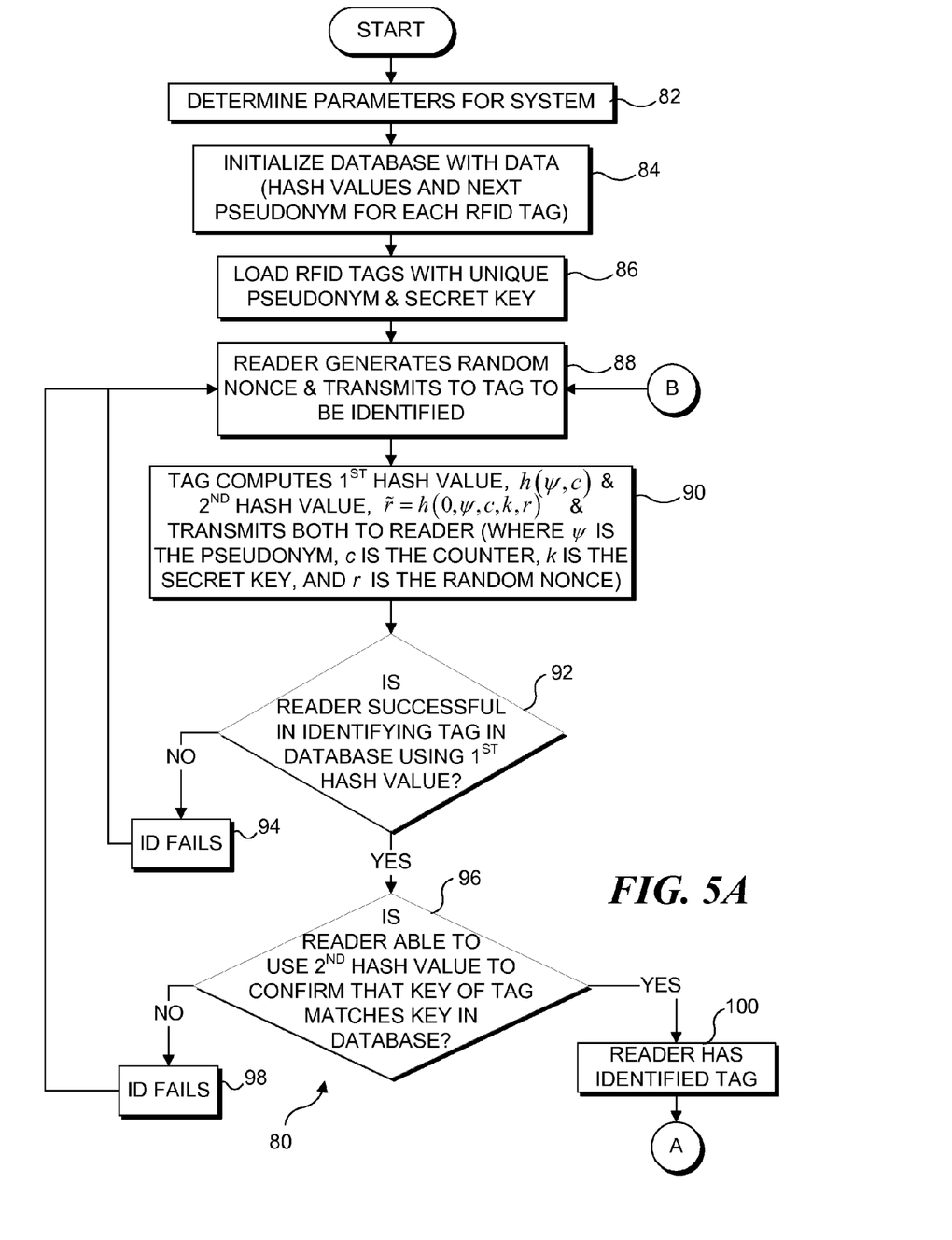
FIGS. 5A and 5B are flowcharts showing exemplary steps for carrying out the method for maintaining privacy while identifying RFID tags, in accord with the approach disclosed herein.
Figure 5B:
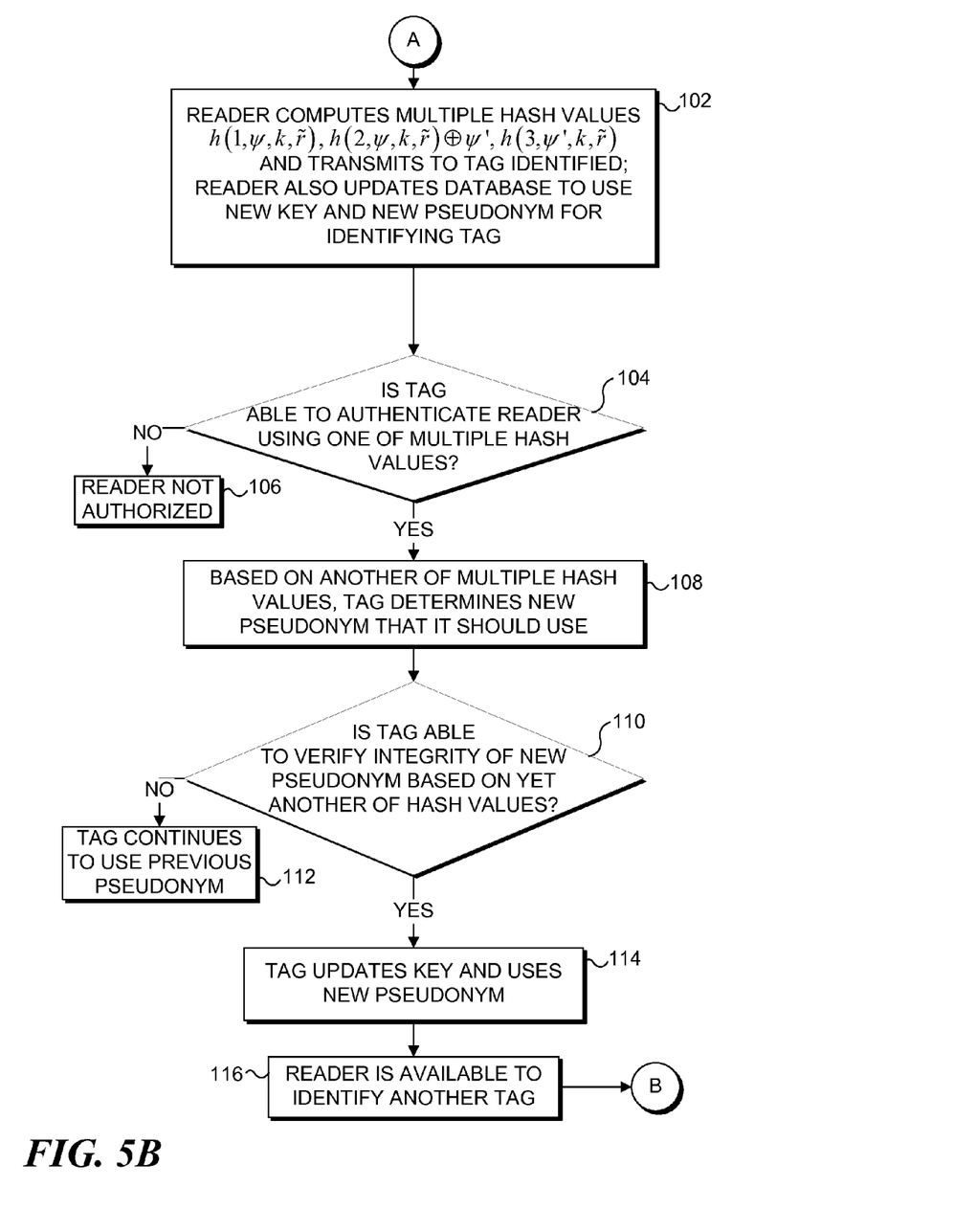

FIGS. 5A and 5B illustrate a flowchart 80 showing exemplary steps for implementing the secure identification of RFID tags, while maintaining privacy. As noted above, the process begins at a step 82 in which the designer of the system selects the parameters that are used, for example, as shown in Table 1. Based upon these parameters, a database is created and initialized to include the hash values for each of N pseudonyms, as well as an indication of a next unique pseudonym that will be provided to an RFID tag after it has been identified. These hash values, secret keys, and pointers are applied to create the database, as discussed above, and in a step 86, each of the RFID tags is loaded with its unique pseudonym and secret key, and the counter on each is set to zero, completing the initialization of the system.

When a RFID tag is to be identified, in a step 88, the RFID reader generates a random nonce (a binary string that is L bits in length) and transmits the nonce to the RFID tag to be identified. The RFID tag uses the unique pseudonym and the counter value to computer a first hash value, and the unique pseudonym, counter value, key, and nonce to compute a second hash value, and then transmits the first and the second hash values to the RFID reader, in a step 90. In a decision step 92, the reader tries to use the first hash value to determine the identity of the RFID by reference to the database. A step 94 indicates that the identification has failed, and the logic would then return to step 88 to wait until the RFID reader needs to identify another RFID tag. However, if the RFID reader was successful, in a decision step 96, the RFID reader tries to use the second hash value to confirm that the key of the RFID tag that was identified matches the secret key for that RFID tag in the database (the secret key is included in the information for the RFID tag that was identified). If not successful, as indicated in a step 98, the logic again returns to step 88 to wait until another RFID tag is to be identified. Otherwise, if successful, a step 100 indicates that the RFID reader has identified the RFID tag. The logic proceeds to a reference A, in FIG. 5B.

In a step 102, the RFID reader computes multiple (third, fourth, and fifth) hash values. The third hash value is computed using the pseudonym, the key, and the second hash value; the fourth hash value is computed using the pseudonym, the key, and the second hash value XORed with the new pseudonym; and, the fifth hash value is computed with the new pseudonym, the key, and the second hash value. The third, fourth, and fifth hash values are then transmitted to the RFID tag that was just identified. With the third hash value, h (1,$\psi$,k,$\tilde{r}$), the RFID tag attempts to authenticate the reader (by verifying its knowledge of its secret key, k). If the reader is authenticated, the RFID tag uses the fourth hash value, h(2, $\psi$,k,$\tilde{r}$)$\oplus\psi'$ to extract the new pseudonym $\psi'$ for the RFID tag. Once the new pseudonym has been computed, the RFID tag verifies the integrity of the new pseudonym using the fifth hash value, h(3,$\psi'$,k,$\tilde{r}$). The RFID tag and the reader then update the RFID tag's secret key to k'=h(k), truncated to the required length, l.

In addition, in step 102, the RFID reader updates the database to indicate that the new secret key and new unique pseudonym are to be associated with the identity of the RFID tag that was just identified. Since there is a chance that the RFID tag will not accept the reader's response, either because the response was modified in the transmission to the RFID tag or was blocked by an adversary, the reader may update the pseudonym for the RFID tag in the database, while the RFID tag does not do so.

To address this problem of the database and RFID having different current pseudonyms, the database stores both the previous and the updated pseudonyms for the RFID tag. An exemplary approach used to facilitate this solution to the problem is indicated in the database update shown in FIG. 4. Instead of emptying the entry in table M-III that stores information about the identified RFID tag (as in field 70 in FIG. 4), information about the tag remains there. By retaining the information, the RFID tag can still be identified—whether if it has updated its pseudonym or not. However, a pointer to field 70 is stored in field 68, where the new information about the tag is copied, so that when the RFID tag is identified in the next run (with the updated pseudonym), the database can delete the information previously stored in field 70. Similarly, a pointer to field 68 should be stored in field 70 so that, if the RFID tag is identified via its previous (now outdated) pseudonym, the information in field 68 can be deleted. Without these pointers, the database will not be able to delete the information corresponding to the previous outdated (or undelivered updated) pseudonym, and thus, multiple copies of RFID tag information will be stored in M-III (one for each identification run).

In a decision step 104, the RFID tag attempts to authenticate the RFID reader using one of the hash values it just received (i.e., the third hash value), but if not successful, a step 106 indicates that the RFID reader is not authorized to interact with the RFID tag. Otherwise, if successful, a step 108 provides that using another of the hash values just received (i.e., the fourth hash value), the RFID tag determines the new unique pseudonym that it should be using for the next attempt at identification by the reader. A decision step 110 determines if the RFID tag can verify the integrity of the new unique pseudonym just determined, based on another of the hash values (i.e., the fifth hash value) just received. If not successful, a step 112 indicates that the RFID tag will not use the new unique pseudonym, but will instead continue using the unique pseudonym that it previously used. Otherwise, if successful in decision step 110, in a step 114, the RFID tag updates its secret key and will use the new unique pseudonym when it is next necessary for the RFID reader to identify the RFID tag. A step 116 indicates that the RFID reader is now available to identify another tag (although it is contemplated that multiple RFID tags might be identified in parallel processes). The logic then returns to reference B at step 88 to wait until the RFID reader must again identify a RFID tag by repeating this process.

Probabilistic Analysis

For the proposed scheme to be practical, it is necessary to show that a set of parameters can be chosen such that the claim of constant-time identification can be achieved with feasible resources (namely, feasible database size). This section is devoted to showing that, with a set of appropriately chosen parameters, the present exemplary technique can achieve constant-time identification with a database of size $O(N_T)$.

Assuming that the $\Psi_{i,c}$'s are uniformly distributed, the probability that the truncated version $\Psi_{i,c}{}^n$ takes a specific value, s, is $\alpha=\Pr(\Psi_{i,c}{}^n=s)=2^{-n}$, for any $s\in\{0,1\}^n$. Let $M:=NC$ and define $m:=\log_2 M$, where N is the total number of pseudonyms and C is the maximum counter value. Then, out of the M values of $\Psi_{i,c}$'s, the probability that exactly k of them share the same truncation value (i.e., exactly k of them have the same n most significant bits) is $$p(k=k) = \binom{M}{k} \alpha^k (1-\alpha)^{M-k}, \quad (2)$$

where k is the random variable representing the number of $\Psi_{i,c}{}^n$ sharing the same value, s, for any $s\in\{0,1\}^n$. Then, for $k \ll M$, $$\binom{M}{k} = \frac{M!}{k!(M-k)!} \approx \frac{M^k}{k!}. \quad (3)$$

Using the fact that $$\lim_{n\to\infty}\left(1-\frac{1}{n}\right)^n = 1/e,$$

the following result is obtained:

$$(1-\alpha)^{M-k} \approx (1-\alpha)^M \quad (4)$$

$$= (1-\alpha)^{2^m} \quad (5)$$

$$= \left(1-\frac{1}{2^n}\right)^{2^m} \quad (6)$$

$$= \left(1-\frac{1}{2^n}\right)^{2^n \cdot 2^{m-n}} \quad (7)$$

$$\approx e^{-2^{m-n}}. \quad (8)$$

Substituting Eqs. (3) and (8) into Eq. (2), and using the fact that $M=2^m$ and $\alpha=2^{-n}$ yields:

$$p(k=k) \approx \frac{M^k}{k!} \cdot \alpha^k \cdot e^{-2^{m-n}} \quad (9)$$

$$= \frac{2^{mk}}{k!} \cdot \frac{1}{2^{nk}} \cdot e^{-2^{m-n}} \quad (10)$$

$$= \frac{1}{k!} \cdot \beta^k \cdot e^{-\beta}, \quad (11)$$

where $\beta=2^{m-n}$. Choosing $m=n$ yields $\beta=1$, and Eq. (11) can be reduced to:

$$p(k=k) \approx \frac{1}{k!} \cdot e^{-1} \text{ for } k = 0, 1, \ldots \quad (12)$$

(It can be shown that $p_k$ is a valid probability mass function by verifying that $\Sigma_{k=0}^{\infty} p(k=k)=1$.)

Using the fact that $$e = \sum_{k=0}^{\infty} \frac{1}{k!},$$

the expected number of truncated $\Psi_{i,c}$ expressions with the same value is:

$$E[k] = \sum_{k=0}^{\infty} k \cdot p(k=k) \qquad (13)$$

$$= \sum_{k=1}^{\infty} k \cdot \frac{1}{k!} \cdot e^{-1} \qquad (14)$$

$$= \sum_{k=1}^{\infty} \frac{1}{(k-1)!} \cdot e^{-1} \qquad (15)$$

$$= e^{-1} \sum_{k=0}^{\infty} \frac{1}{k!} \qquad (16)$$

$$= 1. \qquad (17)$$

Recall that identifiers $\Psi_{i,c}$ with the same truncated value $\Psi_{i,c}{}^n$ will be in the same table in M-II; when the reader receives one of these identifiers, it will have to search the table to be able to identify the RFID tag. Eq. (17), however, implies that the expected size of the tables in M-II is one. Therefore, upon receiving a RFID tag identifier $\Psi_{i,c}$, the reader goes to the table entry in M-I at address $\Psi_{i,c}{}^n$, follows the pointer $p_1$ stored at that address, searches the table in M-II pointed at by $p_1$ for the received $\Psi_{i,c}$ (on average, there will be only one entry—based on Eq. (17)), and then follows a pointer $p_2$ to information about the RFID tag. In fact, the search time required to identify a RFID tag is independent of the number of RFID tags in the system (on average).

Since the database consists of three parts, M-I, M-II, and M-III; and since the size of M-I is $O(2^n)$, the size of M-II is $O(NC)$, and the size of M-III is $O(N)$, the only concern is the size of M-I. The above analysis shows that, by choosing $n = \text{llog}_2 NC$, the system achieves the constant-time identification goal. Therefore, the size of M-I is $O(NC)$ and, consequently, the total size of the database is $O(NC)$. However, C is a constant, independent of the number of RFID tags in the system; and, N is $O(N_T)$. Therefore, with the proposed system, the required size of the database for constant-time identification to be achieved is $O(N_T)$.

TABLE 2

Performance comparison of the present novel exemplary protocol with existing protocols as a function of the number of tags in the system, $N_T$, where Class 1 represents the class of protocols with linear-time identification, while Class 2 represents the class of protocols with logarithmic-time identification.

|  | Search time | Key size | Database size | Communication & computational overhead | Compromise attack |
|---|---|---|---|---|---|
| Class 1 | O(NT) | O(1) | O($N_T$) | O(1) | NO |
| Class 2 | O(log$N_T$) | O(log$N_T$) | O($N_T$) | O(log$N_T$) | YES |
| Novel protocol | O(1) | O(1) | O($N_T$) | O(1) | NO |

Cryptographic Hash Functions

The use of a secure cryptographic one-way hash function (the Secure Hash Algorithm, SHA, family) is a popular example that is accepted as a standard by the National Institute of Standards and Technology, NIST. Under practical assumptions about the adversary's computational power, the used hash function satisfies the following properties.

(1) Given the output of the hash function, it is infeasible to infer the input, i.e., given the value of $h(x)$, the probability to predict the correct value of x is negligible.

(2) Given x and $h(x)$, the probability to predict $h(x+i)$, for any i, without actually evaluating $h(x+i)$ is negligible.

Given the above properties of the hash function used herein, the following lemma states an important result that will be used for the privacy and integrity proofs.

Lemma 1: The secret parameters of RFID tags in the proposed protocol cannot be exposed without calling the Reveal oracle.

Proof In any interrogation, the tag responds with its current identifier $\psi_{i,c} = h(\Psi_i, c)$, where $\psi_i$ is the tag current pseudonym and c is its internal counter. Given the above properties of the hash function that is used in the present approach, the pseudonym cannot be exposed by the observation of $h(\psi_i, c)$ with a non-negligible probability. Furthermore, the new pseudonym is delivered to the tag by transmitting $(h(2, \psi_i, k_i, \tilde{r}) \oplus \psi_{i+1})$, which can be viewed as an encryption of $\psi_{i+1}$ with the key $h(2, \psi_i, k_i, \tilde{r})$. Since $\psi_i$ and $k_i$ are unknown to adversaries, $h(2, \psi_i, k_i, \tilde{r})$ will act as a random key and the new pseudonym $\psi_{i+1}$ will be delivered secretly. Moreover, since the outdated and the updated pseudonyms, $\psi_i$ and $\psi_{i+1}$, are unknown to adversaries, the two identifiers, $h(\psi_i, c)$ and $h(\psi_{i+1}, c)$, cannot be correlated with a non-negligible probability; and similarly, the identifiers $h(\psi_i, c)$ and $h(\psi_i, c+1)$, cannot be correlated with a non-negligible probability. Therefore, unless A calls the Reveal oracle, no secret information about RFID tags in the proposed protocol can be revealed.

Security Analysis—Privacy

The following discussion shows that the proposed protocol preserves the privacy of RFID tags.

Theorem 1: In the proposed protocol, RFID tags are universally untraceable.

Proof Assume the challenger C has chosen two RFID tags, $T_0$ and $T_1$, and a reader R for the game. A starts the game by calling the Query, Send, Execute and Block oracles on $T_0$, $T_1$, and R for a number of times of its choice before deciding to stop. A records all the outputs of the oracle calls and notifies C.

Now, R carries out protocol runs with $T_0$ and $T_1$ causing their pseudonyms and keys to update. C chooses a bit b uniformly at random and sets $T = T_b$. By Lemma 1, A cannot infer the outdated nor the updated values of the RFID tags' pseudonyms and keys. A now calls the oracles Query, Send, Execute and Block and outputs a bit b'. Since A does not know the outdated or the updated pseudonyms, by the assumptions on the used hash function, the probability Pr(b=b') will be greater than ½ with a non-negligible probability.

Therefore, the adversary's advantage, as defined in Eq. (1), will be greater than zero with only a negligible probability.

The following theorem concerns forward untraceability in the protocol used in this exemplary approach.

Theorem 2: In the proposed protocol, RFID tags are forward untraceable.

Proof Similar to the proof of universal untraceability, assume the challenger C has chosen two RFID tags, $T_0$ and $T_1$, and a reader R for the game. A starts the game by calling the Query, Send, Execute, and Block oracles on $T_0$, $T_1$, and R for a number of times of its choice before deciding to stop. A records all the outputs of the oracle calls and notifies C.

Now, R carries out protocol runs with $T_0$ and $T_1$ causing their pseudonyms and keys to update. C chooses a bit b uniformly at random and sets $T = T_b$ and gives it to A. By Lemma 1, A cannot infer the outdated nor the updated values of the RFID tags' pseudonyms and keys. A now calls the Reveal(T) oracle, thus getting T's secret parameters, and then outputs a bit b'. Since A cannot infer the outdated pseudonyms and keys of $T_0$ and $T_1$ from the recorded oracle outputs, and since the updated pseudonyms are chosen independently of the outdated ones, by the assumptions on the used hash function, the probability Pr(b=b') will be greater than ½ with only a non-negligible probability.

Therefore, the adversary's advantage, as defined in Eq. (11), will be greater than zero with only a negligible probability.

Finally, the following theorem concerns existential untraceability in the present exemplary protocol.

Theorem 3: Without being able to achieve mutual authentication with an authorized reader, a RFID tag interrogated fewer than C number of times by an active adversary is untraceable.

Proof Assume that C has given $T_0$ and $T_1$ to A. Let $\psi_0$ and $\psi_1$ denote the pseudonyms of $T_0$ and $T_1$, respectively. Without loss of generality, assume that RFID tags $T_0$ and $T_1$ have their internal counters at zero. A calling the Query oracle on $T_0$ and $T_1$ for m and n times, respectively, where m, n<C will observe the following sequences:

$$[h(\psi_0,0), \ldots, h(\psi_0,m-1)], \qquad (18)$$

$$[h(\psi_1,0), \ldots, h(\psi_1,n-1)]. \qquad (19)$$

The challenger C now chooses a bit b at random, sets $T=T_b$, and gives T to A. By interrogating the RFID tag, A gets an identifier $h(\psi_b,l)$, where $b \in \{0,1\}$ and $l \in \{m, n\}$. Again, by Lemma 1, the pseudonyms $\psi_0$ and $\psi_1$ cannot be recovered by the observation of the sequences in Eqs. (18) and (19).

Furthermore, by the assumptions on the hash function, $h(\psi_0, m)$ and $h(\psi_1,n)$ cannot be correlated to the observed values in Eqs. (18) and (19) with a non-negligible probability. Therefore, the probability that A's guess b' is equal to b can be higher than ½ with only a negligible probability and, thus, $Adv_A=0$ and RFID tags are existentially untraceable, provided that m, n<C.

Mutual Authentication

This discussion is now directed to the other security requirement, authenticity.

Theorem 4: The proposed protocol performs secure mutual authentication.

Proof: Assume that C has given A a RFID tag T and a reader R. Assume further that A has called the Query, Send, Execute, and Block oracles for a number of times of its choice and recorded the oracle outputs.

The first condition of Definition 4 of secure mutual authentication is satisfied by Lemma 1.

Assume now that A attempts to impersonate the RFID tag T. A must answer the reader's challenge r with a response s=(h($\psi$,c),$\tilde{r}$=h(0,$\psi$,c,k,r)), where $\psi$ is the RFID tag's current pseudonym and k is its key. Since $\psi$ and k remain secret, by Lemma 1, A can be successful with only a negligible probability. Observe further that, even if A attempts to impersonate an arbitrary RFID tag in the system (the one with pseudonym $\psi$), A must know the value of k corresponding to the RFID tag with pseudonym $\psi$ in order to be authenticated with a non-negligible probability. Therefore, the probability of impersonating a RFID tag in the system is negligible.

On the other hand, assume that A attempts to impersonate the reader R. A sends r to the RFID tag and receives h($\psi$,c) and $\tilde{r}$=h(0, $\psi$,c,k,r), where $\psi$ is the RFID tag's pseudonym, k is its secret key, and c is its internal counter. Since, by the assumption on the hash function, A cannot infer the secret parameters, the probability of coming up with a response that will be equal to h(1,$\psi$,k,$\tilde{r}$) is negligible. Consequently, the probability of impersonating an authorized reader in the system is negligible.

Therefore, the probability of mutual authentication when the protocol is not honest is negligible and, hence, the second condition of Definition 4 of secure mutual authentication is satisfied.

As shown above, the adversary's probability of causing a desynchronization between the RFID tag and the reader by authenticating herself to either one of them is negligible. Causing a desynchronization by blocking the last message of the protocol can be solved by making the reader store both the updated and the outdated values (as discussed above). Therefore, if the protocol run is honest, mutual authentication will be achieved with probability one and, consequently, the third condition of Definition 4 of secure mutual authentication is satisfied.

Accordingly, all conditions of Definition 4 of secure mutual authentication are satisfied and the proposed protocol is shown to provide secure mutual authentication.

RFID Tag Compromise Vulnerability

The following section describes a vulnerability to RFID tag compromise, modifies the adversarial model to capture this vulnerability, analyzes the system using the modified model, and proposes countermeasures to mitigate RFID tag compromise attacks.

The Compromise Attack

Each RFID tag in the proposed protocol has two pieces of secret information, its pseudonym and its key. Since RFID tags' pseudonyms and keys are designed to be statistically independent for different RFID tags, compromising some RFID tags in the system does not affect the security of other, uncompromised RFID tags. An adversary, however, can compromise a RFID tag in the system and attempt to harvest as many pseudonyms as possible by performing multiple protocol runs with a valid reader.

The adversarial model discussed above can be modified to capture the RFID tag compromise attack. Assume an adversary calling the Reveal (T) oracle, thus capturing the RFID tag T, has the ability to perform multiple protocol runs with the system. Let q be the number of protocol runs an adversary has performed with the system using compromised RFID tags. The number of interest here is how many distinct pseudonyms the adversary has collected, after q protocol runs. This determination is known in the literature of probability theory as the "coupon collecting problem." Given there are N distinct pseudonyms and the adversary has performed q protocol runs, assuming each pseudonym is equally likely to be selected, the expected number of distinct pseudonyms collected by the adversary is:

$$N\left(1-\left(\frac{N-1}{N}\right)^q\right). \qquad (20)$$

Assume an adversary has built a system, similar to the present construction, with the collected pseudonyms. The adversary's advantage of distinguishing between two RFID tags, given by equation (1), will be greater than zero if at least one of the two RFID tags' pseudonyms is in the constructed table. Thus, given the adversary has performed q protocol runs with a system of N pseudonyms, the probability of distinguishing between two RFID tags is:

$$1-\left(\frac{N-1}{N}\right)^{2q}. \qquad (21)$$

Using the value $N=2\times10^9$, as discussed above, to have a 0.001 probability of distinguishing between two RFID tags, an adversary needs to compromise a RFID tag and complete more than a million protocol runs with the system.

Countermeasures

However, the database is a powerful device. Therefore, designing the database to record timing information about the RFID tag's past protocol runs can mitigate this threat. For example, the database can store information about the RFID tag's last five protocol runs (this can be stored as part of the RFID tag's information, i.e., in M-III). If the adversary tries to harvest different pseudonyms by performing multiple protocol runs with the system, the RFID tag will be detected. Therefore, to harvest enough pseudonyms, the adversary will need to compromise more than one RFID tag, depending on the system's parameters and the required probability of success.

Furthermore, the database can periodically update the system by replacing vacant pseudonyms with new pseudonyms (recall that the number of pseudonyms in the database, N, is only a small fraction of the number of all possible pseudonyms, $2^l$). This pseudonym update procedure is performed offline by the database, thus, not affecting identification time. Moreover, as a result of the independence of secret parameters amongst RFID tags, the updating procedure is independent of the RFID tags.

With the periodic update described above, the space of possible pseudonyms will increase to all possible l-bit long strings, as opposed to the predefined smaller number N. Therefore, for a bounded adversary, any polynomial number of collected pseudonyms is negligible in the security parameter l. (Recall that the size of the actual database is still proportional to N; only from the adversary's point of view the size is proportional to $2^l$.) Consequently, the adversary's probability of breaking the privacy of the system is negligible in l, provided the periodic update of the database is carried out.

Exemplary Computing Device for Use in Secure Identification of RFID Tags

Figure 6:
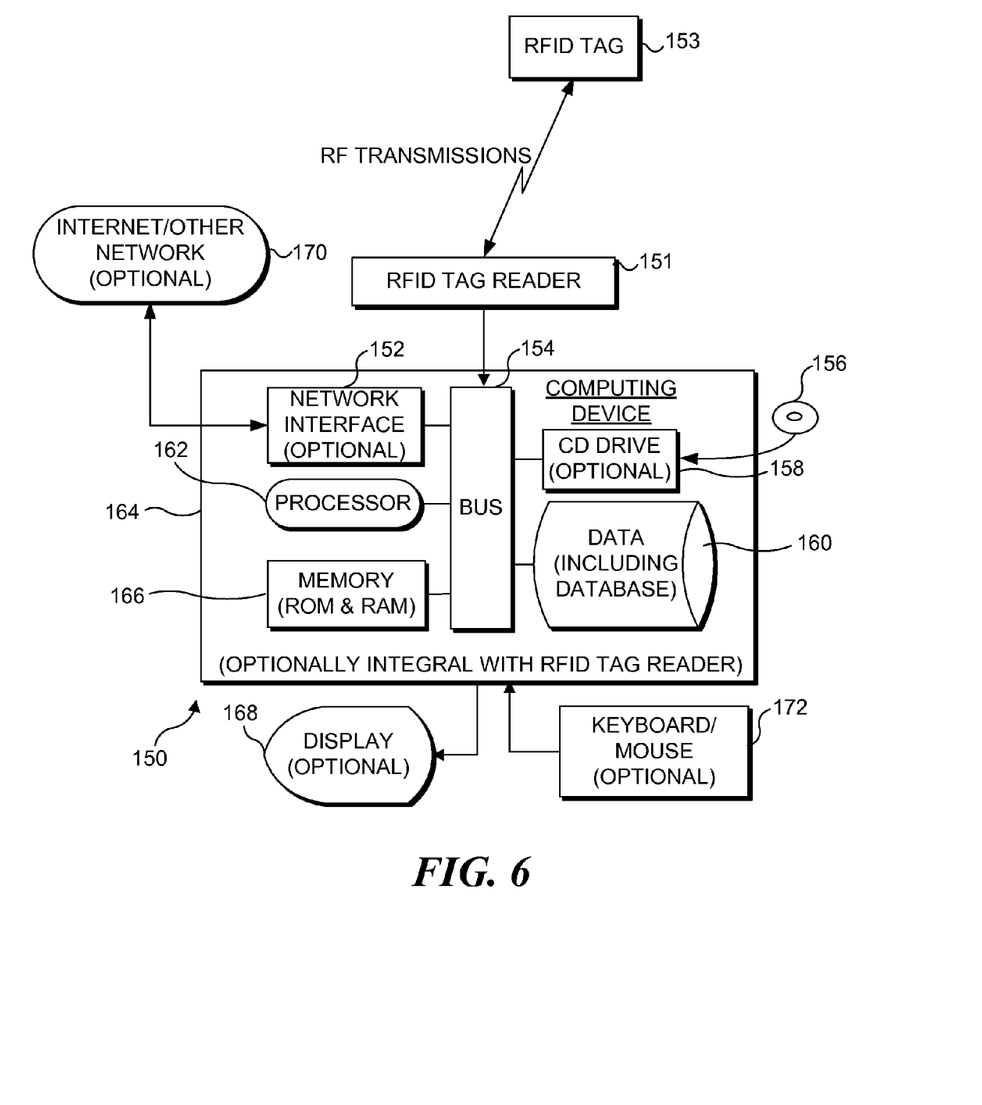
FIG. 6 is a functional block diagram of an exemplary computing device that can be employed in a system for maintaining privacy while identifying RFID tags using data in a database related to the RFID tags.

FIG. 6 schematically illustrates an exemplary system 150 suitable for implementing the present novel technique. System 150 can include a generally conventional personal computer (PC) 164 such as a laptop, desktop computer, personal data assistant, or other form of computing device, but can alternatively comprise a hardwired logic device that is coupled to a RFID tag reader 151 (or which is included as an integral part of the RFID tag reader). RFID tag reader 151 communicates with RFID tags that are to be identified using bi-directional radio transmissions, as is well known in this art. FIG. 6 illustrates only a single RFID tag 153, for purposes of simplicity, but it will be understood that many more such RFID tags can be identified in the database served by system 150, so that RFID tag reader 151 may be in communication with any of these many RFID tags from time-to-time, when there is a need to securely identify and authenticate one of them.

PC 164 is optionally coupled to a display 168, which is used for displaying text and graphics to a user. Included within PC 164 is a processor 162. A memory 166 (with both read only memory (ROM) and random access memory (RAM)), and a non-volatile storage 160 (such as a hard drive or other non-volatile data storage device) for storage of data, the database used for identifying the RFID tags, and software programs are coupled to processor 162 through a bus 154. Optionally, a network interface 152, and an optical drive 158 can also be coupled to the processor. Optical drive 158 can read a compact disk (CD) 156 (or other optical storage media, such as a digital video disk (DVD) or Blu-Ray disk) on which machine instructions are stored for implementing the present novel technique, as well as other software modules and programs that may be run by PC 164. The machine instructions are loaded into memory 166 before being executed by processor 162 to carry out the steps for implementing the present technique.

The user employs PC 164 to control access to the database in order to identify RFID tags when processor 162 executes the machine instructions stored in memory 166 and to carry out the logical steps implemented by the RFID tag reader, as discussed above. The database can be stored on non-volatile storage 160 or can be stored in a different location that is accessed by the connection to optional Internet/other network 170, through network interface 152. Generally, the selection of parameters and any other input used in this novel approach can be implemented with input by a user provided PC 164 using an optional keyboard/mouse 172 and displayed on an optional display 168, or can be predefined and stored in memory 166 or on non-volatile storage 160. Optional display 168 can also display information about RFID tag 153, for example, to indicate its identity once it has been identified and authenticated as discussed above.

It must again be emphasized that a hardwired logic device or application specific integrated circuit (ASIC) can be employed for controlling the logical steps implemented by the RFID tag reader to securely identify RFID tags while maintaining privacy, instead of PC 164. PC 164 is illustrated to provide only an example of one type of computing device that can be employed for this purpose.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for securely identifying and authenticating radio frequency identification (RFID) tags while maintaining privacy, comprising steps of:
    (a) providing each RFID tag with an internal counter, a unique pseudonym, and a secret key, and creating a database in which the RFID tags are identified;
    (b) generating a random nonce and conveying the random nonce to an RFID tag that is to be identified;
    (c) at the RFID tag to be identified, computing:
        (i) a first hash value of the unique pseudonym and a current value of the counter for the RFID tag that is to be identified; and,
        (ii) a second hash value that is a function of the secret key, the random nonce, the unique pseudonym, and the current value of the counter for the RFID tag that is to be identified;
    (d) conveying the first hash value and the second hash value to a reader;
    (e) accessing the database to attempt to identify the RFID tag that is to be identified as a function of the first hash value conveyed to the reader, the database associating the unique pseudonym, the secret key, and a new unique pseudonym for the RFID tag that is to be identified with the first hash value; and
    (f) if successful in identifying the RFID tag that is to be identified, authenticating that the RFID tag for which the first and the second hash values were computed is the RFID tag that was identified in the database, by using the second hash value to confirm that the RFID tag that is to be identified had the secret key that was stored in the database for the RFID tag that was identified.

2. The method of claim 1, wherein if the RFID tag that was identified is authenticated, further comprising steps of:

(a) computing a plurality of hash values as functions of the pseudonym, the secret key, the second hash conveyed to the reader, and the new unique pseudonym;
(b) conveying the plurality of hash values to the RFID tag that was identified and authenticated;
(c) authenticating the reader using one of the plurality of hash values conveyed to the RFID tag that was identified; and
(d) if the reader was authenticated:
  (i) using another of the plurality of hash values to determine the new unique pseudonym; and
  (ii) using still another of the plurality of hash values to verify an integrity of the new pseudonym that was determined.

3. The method of claim 1, further comprising steps of:
(a) selecting parameters required to start initializing data included in the database and in each of the RFID tags;
(b) using the parameters selected, initializing the database so that it associates a first hash value, a secret key, and a new unique pseudonym with each RFID tag that can be identified; and
(c) loading the unique pseudonym and secret key into each of the RFID tags.

4. The method of claim 3, further comprising a step of choosing a function for use in computing the first hash value and the second hash value so that the first and the second hash values included in the database for each RFID tag that can be identified are distinct, to minimize a probability of collisions between hash values associated with different RFID tags.

5. The method of claim 3, wherein the step of selecting parameters includes a step of selecting at least one parameter from the group consisting of:
(a) a total number of unique pseudonyms that can be used for the RFID tags, where a total number of the RFID tags is less than the total number of unique pseudonyms;
(b) a maximum counter value that can be employed by the RFID tags;
(c) a length in bits for the secret keys and for the unique pseudonyms;
(d) a hash function used to compute the first hash value and the second hash value when identifying an RFID tag, as well as an output length of the hash function; and
(e) a length of truncated hash values used to access data in the database.

6. The method of claim 1, further comprising a step of organizing the database to include pointers to other parts of the database, a first hash value for each different RFID tag that can be identified, and information about each RFID tag in association with a unique pseudonym for the RFID tag.

7. The method of claim 6, further comprising a step of organizing the database with three parts, including a first part that comprises pointers that are truncated first hash values and which point to mini tables in a second part of the database, the second part including mini tables of untruncated first hash values for the RFID tags and second pointers to the information about RFID tags, and the third part of the database including information about the RFID tags.

8. The method of claim 1, further comprising a step of modifying the database each time that a new unique pseudonym is provided to one of the RFID tags, so that the new unique pseudonym, the first hash value, and the second hash value are updated and associated with the information about the one RFID tag that was just provided the new unique pseudonym.

9. The method of claim 1, further comprising a step of randomly selecting the unique pseudonyms provided to the RFID tags from a set of all possible bit strings of a predefined number of bits, so that a different unique pseudonym is provided to each RFID tag, and in the database, is associated with the RFID tag to which it was just provided.

10. A non-transitory computer readable memory medium on which are stored machine executable instructions, which when executed by a processor, carry out a plurality of functions for securely identifying and authenticating radio frequency identification (RFID) tags while maintaining privacy, including:
(a) creating a database in which the RFID tags are identified;
(b) generating a random nonce that can be conveyed to an RFID tag that is to be identified;
(c) processing a first hash value and a second hash value that has been conveyed from the RFID tag that is to be identified, the first hash value being computed as a function of a unique pseudonym and a current value of a counter of the RFID tag that is to be identified, and the second hash value being computed by the RFID tag that is be identified as a function of the random nonce, the unique pseudonym, and the current value of the counter of the RFID tag that is to be identified;
(d) accessing the database to identify the RFID tag that is to be identified as a function of the first hash value conveyed from the RFID tag that is to be identified, the database also associating the unique pseudonym, the secret key, and a new pseudonym for the RFID tag that is to be identified with the first hash value; and
(e) if successful in identifying the RFID tag that is to be identified, authenticating that the RFID tag for which the first and the second hash values were computed is the RFID tag that was identified in the database, by using the second hash value to confirm that the RFID tag that is to be identified had the secret key that was stored in the database for the RFID tag that was identified.

* * * * *